United States Patent [19]
Abbott, III et al.

[11] Patent Number: 5,885,652
[45] Date of Patent: Mar. 23, 1999

[54] METHOD AND APPARATUS FOR COATING OPTICAL FIBERS

[75] Inventors: John S. Abbott, III, Elmira; Douglas G. Neilson, Corning, both of N.Y.

[73] Assignee: Corning Incorporated, Corning, N.Y.

[21] Appl. No.: 728,714

[22] Filed: Oct. 11, 1996

Related U.S. Application Data

[60] Provisional application No. 60/006,560 Nov. 13, 1995.

[51] Int. Cl.⁶ ....................................................... B05D 5/06
[52] U.S. Cl. .................................. 427/163.2; 427/434.2; 427/434.7; 427/358; 427/385.5; 65/382; 65/29.19; 118/600; 118/667; 118/698; 118/420
[58] Field of Search ............................... 427/163.2, 434.2, 427/434.7, 358; 65/382, 29.19; 118/600, 667, 698, 420

[56] References Cited

U.S. PATENT DOCUMENTS

| | | | |
|---|---|---|---|
| 4,622,242 | 11/1986 | Mackay | 427/163.2 |
| 5,366,527 | 11/1994 | Amos et al. | 427/163.2 |

*Primary Examiner*—Janyce Bell
*Attorney, Agent, or Firm*—W. J. Simmons, Jr.

[57] ABSTRACT

The fiber-coating concentricity of a coated optical fiber is controlled by non-axisymmetrically heating the coating material in the sizing die with respect to the z-axis along which the fiber is drawn. By controlling the temperature profile and thus the viscosity profile of the coating material, the amount of coating material applied to each azimuthal position of the fiber is controlled as it exits the sizing die. The apparatus that provides the desired temperature profile can also be employed to control the coating diameter.

20 Claims, 8 Drawing Sheets

METHOD AND APPARATUS FOR COATING OPTICAL FIBERS

This application claims priority of U.S. Provisional Application Ser. No. 60/006,560 filed Nov. 13, 1995.

BACKGROUND OF THE INVENTION

This invention relates to a method and apparatus for controlling the concentricity of a coating applied to an optical fiber. The diameter can also be controlled.

During the process of drawing optical fibers, a protective coating is applied to the drawn fiber before the pristine surface of the fiber is damaged by subsequent handling, either during manufacture or subsequent use. This coating step is typically performed as an integral part of the drawing process to ensure that the coating material is applied before the surface of the fiber is damaged.

A coating material commonly used in the manufacture of optical fibers is an acrylate-based composition which is curable by exposure to ultraviolet (UV) light. This material is applied to the surface of the fiber in a liquid state and is subsequently exposed to UV light for curing. The coating material may be applied in one or more layers, with a two-layer coating system being a preferred embodiment. The primary coating is applied directly to the surface of the fiber, and the secondary coating is applied over the primary coating.

Higher draw rates reduce the cost of manufacturing optical fiber. When coating an optical fiber, it is important to produce, at high draw rates, coatings which have uniform diameter and which are concentric with the fiber. Both of these attributes contribute to ease in splicing and connectorization of the fiber, thereby providing for lower losses in an installed fiber application. Market demands continue to place more stringent tolerances on the diameter and concentricity of optical fiber coatings.

A fiber drawing and coating system, as currently used in the production of optical fibers, is shown in FIG. 1. Fiber 10 is drawn from preform 11 which is heated in furnace 1. Fiber 10 passes through fiber cooling device 2 and then through primary coater 3 where it is coated with a layer of primary coating material. The primary coating layer is cured in primary coating curing device 4, and the diameter of the fiber including the cured primary coating is measured by device 5. Curing device 4 typically comprises an irradiator array. Fiber 10 then passes through secondary coater 6 where it is coated with a layer of secondary coating material that is cured in curing device 7 which is similar to curing device 4. The diameter of the fiber including the cured secondary coating is measured by device 8. Tractor means 9 pulls the fiber from furnace 1 and through the intermediate devices. The drawn fiber is typically taken up onto spools by a winder (not shown) for further processing. Coating material is supplied to coaters 3 and 6 from sources 12 and 14, respectively. The inlet or "bulk" temperature of the coating material can be maintained at a desired value by devices 13 and 15, respectively, which are in communication with the coating delivery line. Examples of coating material heaters can be found in U.S. Pat. Nos. 4,073,974 and 4,622,242.

FIG. 2 shows a typical coating die assembly currently used in the process of coating optical fibers. Fiber 21 enters coating die assembly 20 through guide die 22. Coating material is delivered to coating die assembly 20 through holes 24 in insert 23. The temperature controlled coating material is radially distributed about insert 23 before entering die assembly 20. The coating material is typically supplied to die assembly 20 under pressure. A pressurized coater insures that the level of coating material inside die assembly 20 is maintained at the same level throughout the fiber coating process. Fiber 21 exits coating die assembly 20 through sizing die 25. As fiber 21 passes through coating die assembly 20, the coating material is accelerated. As the coating material and fiber 21 enter sizing die 25, a portion of the coating material is pulled out with the fiber. The coating material that is accelerated by the fiber, but not pulled out with the fiber, recirculates within coating die assembly 20. Coating die assembly 20, as shown in FIG. 2, is similar to that disclosed in U.S. Pat. No. 4,531,959, the relevant portions of which are incorporated herein by reference. The coating may be applied using the method disclosed in U.S. Pat. No. 4,792,347 for reducing the formation of bubbles in the coating.

The amount of coating material which is drawn out with fiber 21 is dependent on the velocity profile of the coating material within sizing die 25. This velocity profile is most affected by the speed at which fiber 21 is drawn through coating die assembly 20, the geometry of sizing die 25 and the viscosity profile of the coating material in sizing die 25. The viscosity profile of the coating material is a function of its temperature, which is influenced by: i) the temperature of fiber 21; ii) the temperature of the walls of sizing die 25; iii) internal heat generation known as "viscous heating" which is the result of the conversion of mechanical energy to thermal energy via fluid friction; iv) the temperature of the incoming coating liquid; and v) the temperature of any surface with which the coating liquid thermally communicates. When the region in which the viscosity profile is controlled, by controlling the temperature of the coating material, is localized to land region 26 of sizing die 25, very responsive control of coated fiber diameter can be achieved. Die land region 26 is defined as the region at the exit of sizing die 25 where the diameter of inner wall 27 of sizing die 25 is substantially constant with distance from the exit of sizing die 25. U.S. Pat. No. 5,366,527, which is incorporated herein by reference, provides further discussion of the dynamics of the coating process.

U.S. Pat. No. 5,366,527 discloses a method for controlling the diameter of a coated optical fiber by heating the coating material in the coater; it teaches that the heating of the coating material should be localized to a region of the coating die assembly in which more rapid changes in the temperature of the coating material within the sizing die can be achieved. For example, heating may be advantageously localized in the portion of the sizing die surrounding land region 26. One embodiment of the invention disclosed in U.S. Pat. No. 5,366,527 is shown in FIG. 3 which shows a coating die assembly similar to that of FIG. 2. Temperature control jacket 30 is placed around the outside wall 31 of sizing die 25. Jacket 30 is capable of raising or lowering the temperature of the outside wall 31 of sizing die 25, thereby raising or lowering the temperature of inner wall 27. The temperature adjustment provided by jacket 30 can be controlled by a control system as shown in FIG. 1. If jacket 30 consisted of a resistance heater, for example, the coating diameter signal from device 8 would be processed to generate a control signal that varied the voltage applied to that resistance heater. The measurement of the diameter of the coated fiber determines the level of heating required to maintain the diameter of the coated fiber at a target value.

Very rapid changes in the temperature of the coating material can be achieved by adjusting the temperature of bottom surface 33 of sizing die 25, resulting in very responsive control of coated fiber diameter. In this regard, U.S. Pat.

No. 5,366,527 teaches the use of temperature controlled chips or plates in thermal contact with the bottom of the sizing die. For example, a thermoelectric chip that employs the Peltier effect can operate as a heat pump to uniformly heat or cool that region of the sizing die from which the coated fiber exits. In another embodiment, a disk made of a high thermal conductivity material thermally communicates with the bottom of the sizing die. A heat transfer tube that is in thermal contact with the disk extends through both a resistance heater and a fluid-cooled heat sink, whereby the disk can uniformly heat or cool an annular region at the bottom of the sizing die.

While the method of U.S. Pat. No. 5,366,527 can control the coated fiber diameter in response to a signal that is generated in response to the deviation of the actual diameter with respect to a predetermined setpoint diameter, that apparatus is incapable of correcting for coatings that are not concentric with the optical fiber.

U.S. Pat. Nos. 4,321,072, 4,363,827, 4,390,897, 4,957,526 and 5,176,731 teach methods of applying coatings that are concentric with respect to an optical fiber. The concentricity of the coating with respect to the fiber is analyzed by a known technique such as one disclosed in those patents or in the publications: The Bell System Technical Journal, 55, No. 10 (December 1976), pp. 1525–1537; Applied Optics, 16 (1977), page 2383; or Advanced Instrumentation, 36 (1980), pp. 229–231. All of these patents teach that concentricity of the coating can be controlled in response to the error signal by mechanically shifting to coater to center the fiber in the coating. U.S. Pat. No. 4,363,827 states that the centering of the fiber within the coating apparatus can also be obtained by movement of the fiber. The systems disclosed in these patents are disadvantageous because of the complex mechanical devices that are needed to correct for fiber-coating non-concentricity.

SUMMARY OF THE INVENTION

It is therefore an object of the invention to provide a simple, non-mechanical technique for maintaining a coating concentric with respect to an optical fiber. Another object is to provide a fiber coating method and apparatus wherein the fiber-coating concentricity and the coating thickness are controlled by a single apparatus.

One aspect of the invention concerns a method for controlling the fiber-coating concentricity of a coated optical fiber. A coating material is introduced into a coater having a sizing die. The fiber is passed through the coater, and a non-axisymmetrical temperature gradient is generated in the coating material which surrounds the fiber within the sizing die to control the fiber-coating concentricity.

The fiber-coating concentricity of the coated optical fiber can be measured to generate a signal that controls the non-axisymmetrical temperature gradient.

Another aspect of the invention concerns an apparatus for applying a coating to an optical fiber. The apparatus comprises means for introducing a coating material into a coater having a sizing die, and means for continually drawing an optical fiber such that the fiber passes through the coater. Means is provided for generating a non-axisymmetrical temperature gradient in the coating material within the sizing die to control fiber-coating concentricity.

DETAILED DESCRIPTION

During the coating of optical fibers a coating may be non-concentric with respect to the fiber because of some problem such as coater-fiber misalignment, coater tilt, coater die manufacturing flaw or the like. In accordance with the present invention, a non-axisymmetric temperature profile within the coater sizing die can correct the non-concentric coating. A fiber that is drawn through a coater extends along the z-axis of the apparatus. A temperature profile is non-axisymmetric within the sizing die when it is azimuthally nonuniform with respect to the z-axis. The method of the invention is advantageous because it does not require mechanical movement of parts and because the coating temperature can be simultaneously adjusted to control the coating diameter, whereby that the overall complexity of the system is reduced as compared to apparatus employing a mechanical coater shifter.

Figure 2:
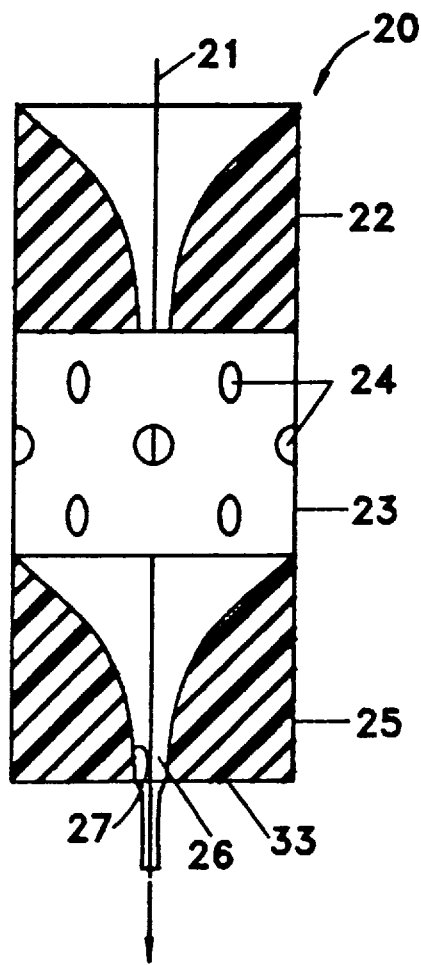
FIG. 2 is cross-sectional view of a typical coating die assembly.
Figure 4:
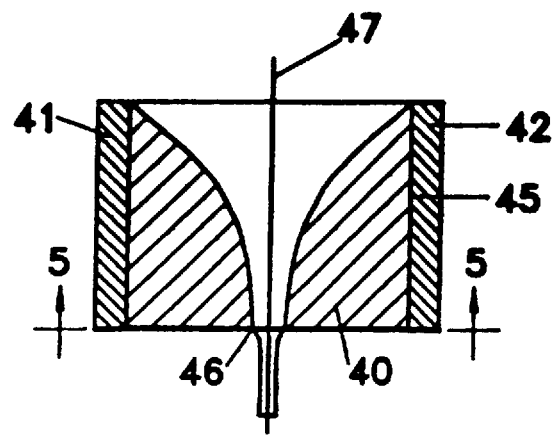
FIG. 4 is a cross-sectional view of a sizing die that is adapted to control fiber-coating concentricity.
Figure 5:
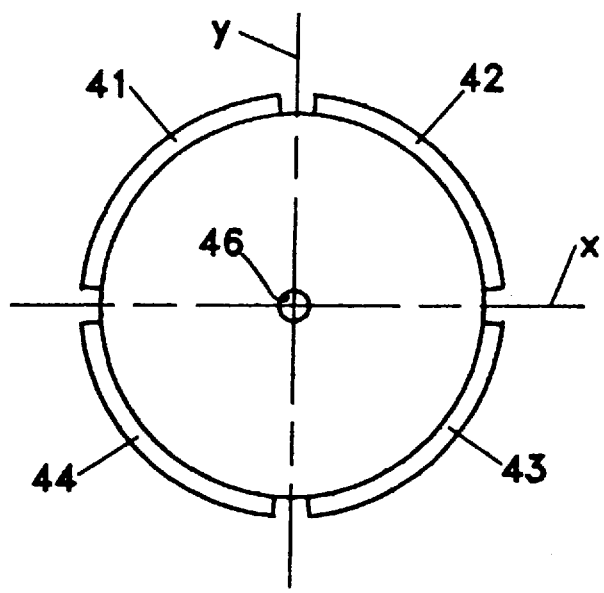
FIG. 5 is a view taken along lines 5—5 of FIG. 4.

One embodiment of the invention is shown in FIGS. 4 and 5 in which only the sizing die 40 of the coating die assembly is illustrated; the remainder of the assembly could be as shown in FIG. 2. The sizing die should be formed of a heat conductive material such as tungsten carbide, stainless steel, aluminum, brass or the like. The sizing die temperature control jacket consists of four segments 41, 42, 43 and 44 that are formed on the outside wall 45 of die 40. If desired, thermally insulating material could be inserted into the gaps between adjacent segments 41–44. The temperature of each of the segments can be controlled independently, whereby the coating material within the sizing die can be non-axisymmetrically heated with respect to the z-axis. Therefore, a thermal gradient can be generated across the exit orifice 46 of the sizing die at any orientation that is necessary to correct for a detected fiber-coating non-concentricity. This will result in a viscosity difference across sizing die exit orifice 46, and thus a difference in flow from the various azimuthal regions of orifice 46 (with respect to the z-axis).

Note that segments 41–44 can in principle be heated or cooled. For example, each temperature control segment could be cooled by placing it in thermal contact with a respective heat transfer tube that is also in thermal contact with a separate fluid cooled heat sink. The temperature of the segment could be varied by changing the temperature of the fluid. However, simplicity of design seems to suggest that heating all four segments is the simplest and most effective design.

Whereas four temperature control segments are shown in FIGS. 4 and 5, as few as three segments could be employed.

As shown in FIG. 5, the x and y coordinates lie in a plane perpendicular to the z-axis. With as few as three independently heatable segments, the following three variables can be controlled: (1) average coating thickness, (2) x-component of coating concentricity, and (3) y-component of coating concentricity. Alternatively, more than four segments could be used, greater control of the temperature profile of the coating material in the die land region and in the exit orifice being obtained as the number of segments increase.

Figure 6:
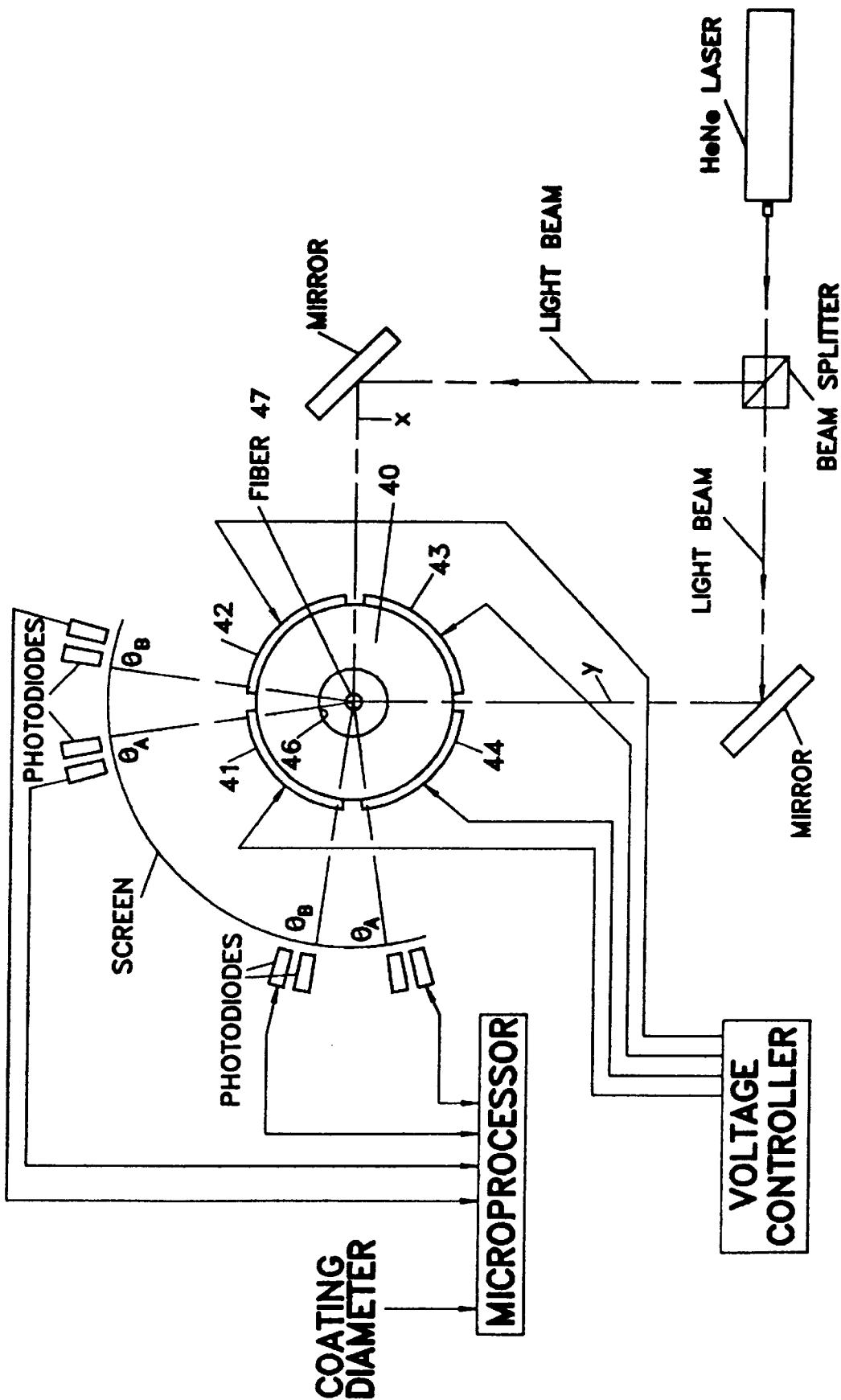
FIG. 6 schematically illustrates a fiber-coating concentricity measuring system that can be used in conjunction with the die of FIGS. 4 and 5.

FIG. 6 illustrates the manner in which the thermal control could be linked to an on-line measurement of coating concentricity. Coater 40 is the same coater that is shown in FIGS. 4 and 5. The optical system is the same as that which is disclosed in U.S. Pat. No. 4,363,827. The signals from the photodiodes are fed to a microprocessor which causes the voltage controller to supply the correct voltages to heaters 41–44. In addition to receiving concentricity signals from the diodes the microprocessor also receives coating diameter information from a conventional coating diameter measurement device. As compared with the coater positioning technique disclosed in U.S. Pat. No. 4,363,827, the advantage of thermally controlling the fiber-coating concentricity arises from the fact that concentricity can be combined with the thermal control of coating diameter. That is, both the coating diameter and fiber-mating concentricity are controlled by appropriately energizing each of the heater segments 41–44.

A commercially available device, the TAI MicroENTIS system, which is capable of measuring both coating diameter and coating concentricity, is available from TAI Incorporated, 7500 Memorial Parkway SW, Suite 119, Huntsville, Ala. 35802. Commercially available devices for measuring coating diameter are available from LaserMike Inc., 6060 Executive Boulevard, Dayton, Ohio 45424 and Beta Instrument Inc., Taunton Corporate Center, 125 John Hancock Road, Taunton, Mass. 02780. A commercially available device for measuring coating concentricity is available from Heathway Inc., 903 Sheehy Drive, Horsham, Penn. 19044.

Figure 7:
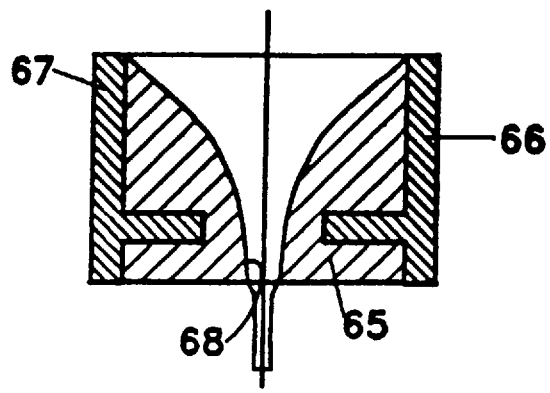
FIGS. 7, 8 and 9 are cross-sectional views of further embodiments of the invention.

In the embodiment of FIG. 7, sizing die 65 has been drilled so that the heating elements 66 and 67 can extend closer to sizing die inner surface 68 and thus more strongly affect the temperature at the inner surface.

Figure 3:
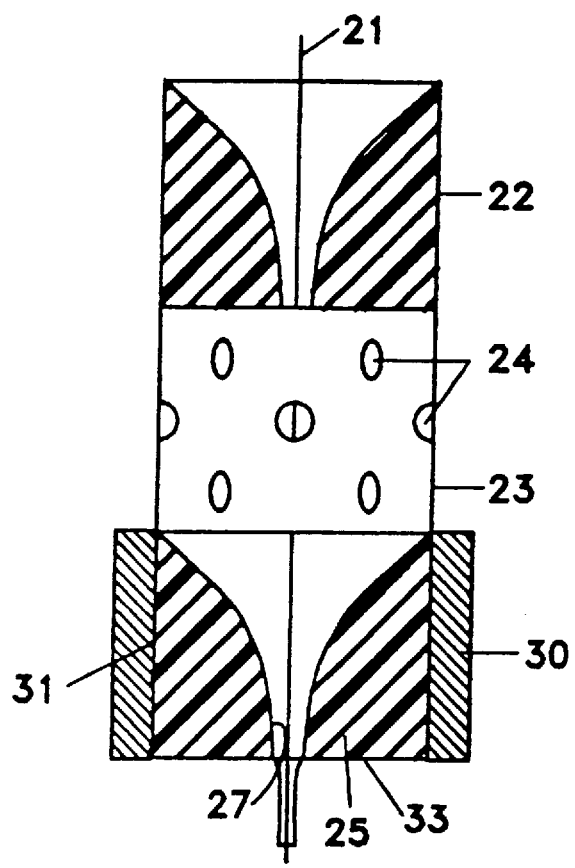
FIG. 3 is a cross-sectional view of a prior art coating die assembly that is used in a system for automatically controlling coating diameter.
Figure 8:
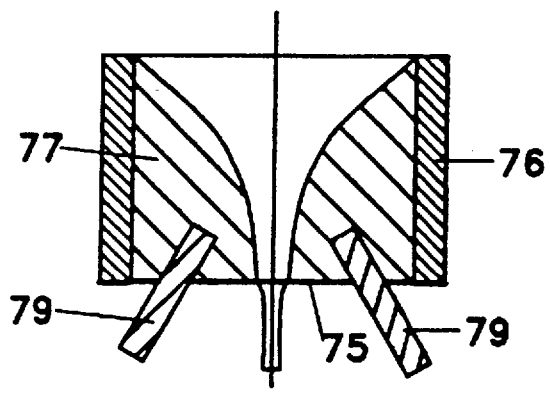

FIG. 8 shows a design wherein a unitary heater 76 (similar to heater 30 of FIG. 3) can be used in conjunction with segmented or auxiliary heaters 79. Sizing die 77 is axisymmetrically heated by heater 76, whereas it can be non-axisymmetrically heated by auxiliary heaters 79.

Figure 9:
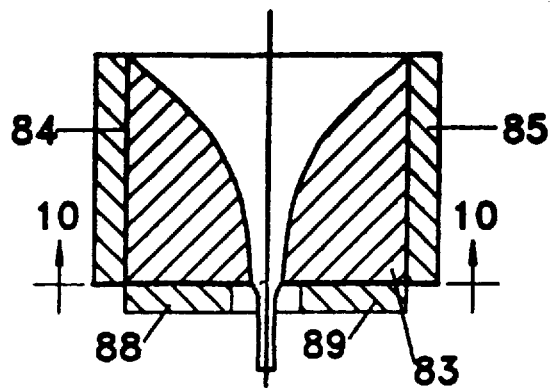
Figure 10:
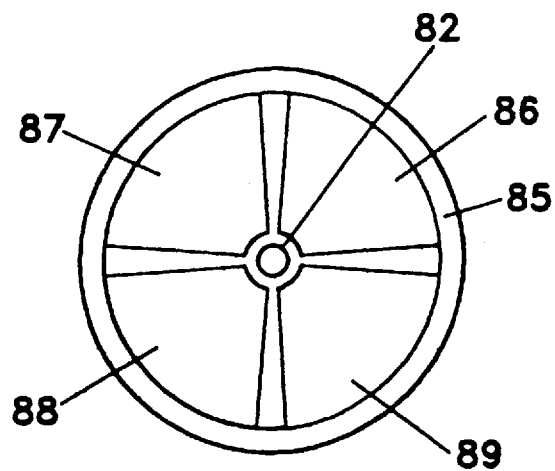
FIG. 10 is a view taken along lines 10—10 of FIG. 9.

FIGS. 9 and 10 show another embodiment wherein a unitary heater 85 is employed to axisymmetrically heat coater 83, the heat from heater 85 being supplemented by a disk heater formed of segments 86, 87, 88 and 89. Heater 85 primarily determines the thickness of the coating on coated fiber 82, whereas segments 86–89 generate a temperature profile that maintains the coating concentric with the optical fiber.

Figure 1:
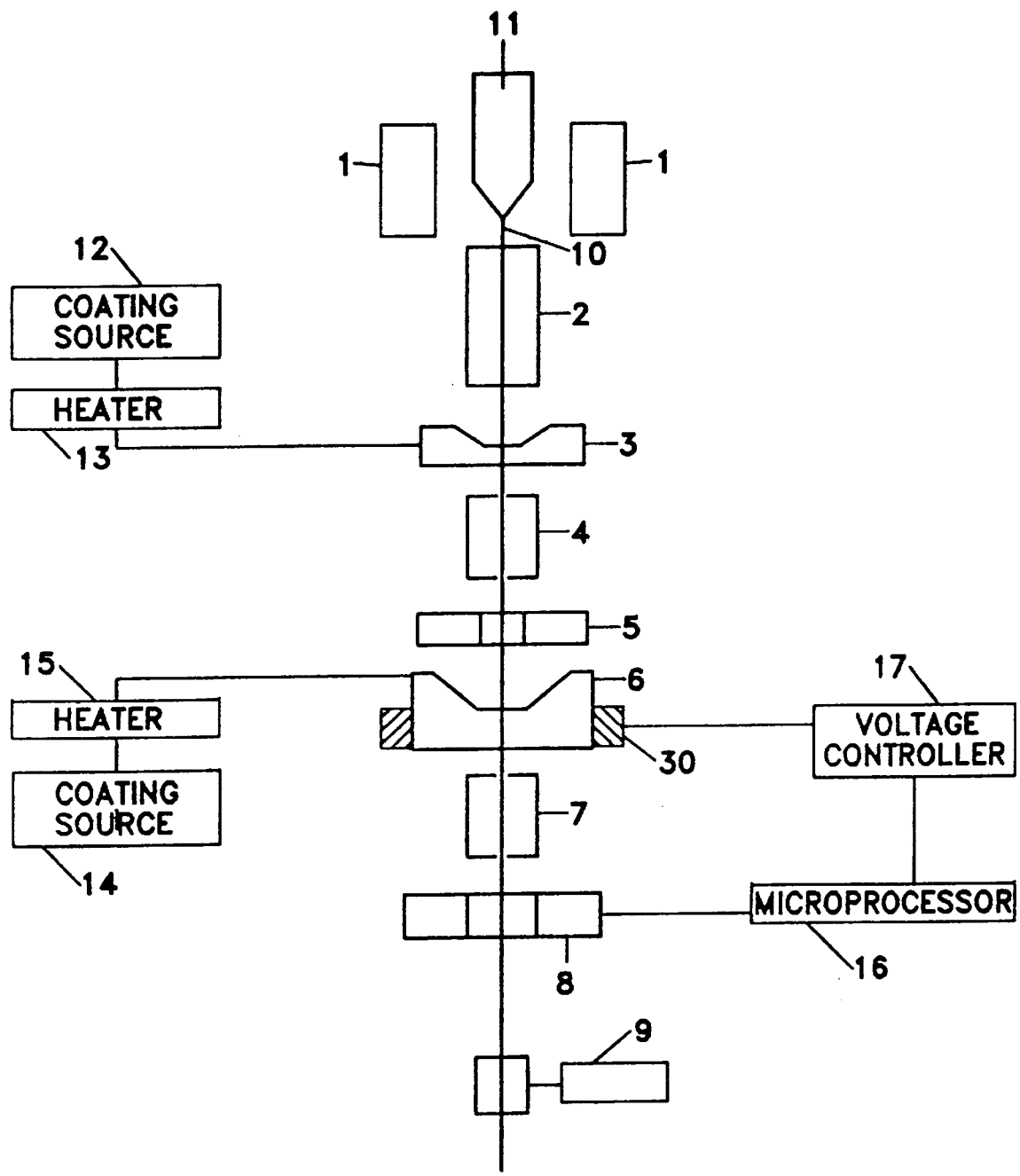
FIG. 1 is a block representation of a typical prior art fiber drawing apparatus.
Figure 11:
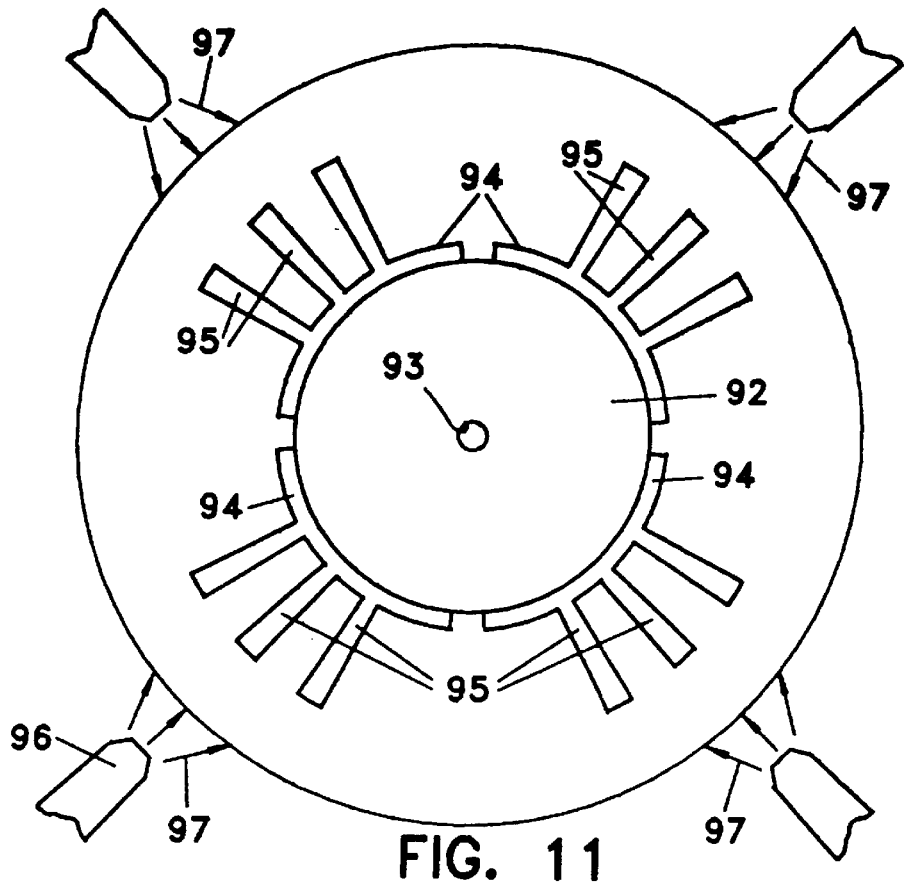
FIGS. 11 and 12 show means for cooling thermally conductive segments that are spaced about the circumference of a sizing die.

FIG. 11 illustrates an embodiment wherein the coating material is heated by means such as heater 13 (FIG. 1) prior to entering the coater and is then partially cooled to control fiber-coating concentricity. Sizing die 92 has an exit orifice 93 in the bottom thereof. A coolant jacket comprising segments 94 of thermally conductive material is affixed to the sidewall of the sizing die. Segments 94 have a plurality of fins 95 to which jets 97 of gas are directed by means such as nozzle 97. The temperature of the gas jets could vary from nozzle to nozzle to produce a circumferential temperature gradient about sizing die 92. Alternatively, the temperature of the jets could be constant, and the rate of flow from each jet could be regulated to effect the desired circumferential temperature gradient. Thus, the desired temperature gradient across the exit orifice can be achieved.

At high fiber draw speeds it is typically more difficult to maintain a concentric coating, and a larger thermal gradient is required. The embodiment in FIG. 11 is advantageous where high rates of heating on one side and cooling on the other are needed to maintain the required thermal gradient across the die. The segments 94 and fins 95 can be fabricated as an integral part of the die 92 to reduce potential problems with thermal contact resistance or thermal expansion mismatch.

In a modification of the device of FIG. 11, the thermally conductive jacket is continuous, and the fins are uniformly spaced about the jacket. The desired number of jets could be uniformly spaced about the device.

Figure 12:
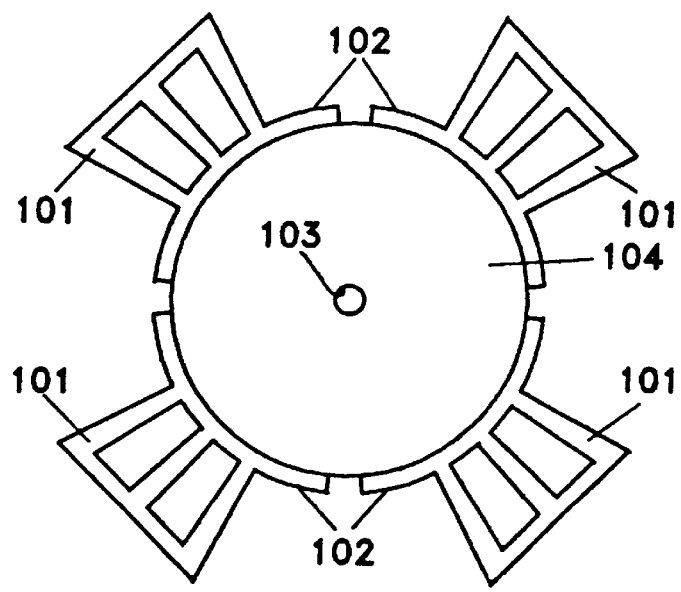

FIG. 12 shows heat transfer tubes 101 in thermal contact with segments 102 which surround exit die 104 which has an exit orifice 103 in the bottom surface thereof. The temperature of each segment can be controlled by varying the temperature of fluid flowing through tubes 101.

The present invention has been particularly shown and described with reference to the preferred embodiments thereof; however, it will be understood by those skilled in the art that various changes may be made in the form and details of these embodiments without departing from the true spirit and scope of the invention as defined by the following claims. For example, the present invention would be applicable to the manufacture of ribbon cables, wherein it is desirable to control the concentricity of a primary coating which is applied to each of an array of optical fibers before they are incorporated into a ribbon cable. The present invention is applicable to the application of primary, secondary and any other coatings applied to single optical fibers. The present invention is also applicable to coating processes which are not integral to the fiber drawing process such as, for example, stand-alone coating processes.

The method of the present invention could also be employed to form coated optical fibers having an elliptical cross-section. U.S. Pat. No. 4,950,047 teaches that such a coating can be employed to properly orient a polarization maintaining optical fiber. An optical fiber having an elliptical coating could be formed by supplying more power to heater segments 42 and 44 than to heater segments 41 and 43 of FIGS. 4 and 5.

We claim:

1. A method for coating an optical fiber, comprising
    a. introducing a curable coating material into a coater having a sizing die,
    b. passing the fiber through said coater, and
    c. generating a non-axisymmetrical temperature gradient in the coating material which surrounds said fiber within said sizing die to control the fiber-coating concentricity.

2. The method of claim 1, wherein step of generating a temperature gradient comprises controlling the temperature of an outer wall surface of said sizing die such that the temperature of said outer wall surface is azimuthally non-uniform.

3. The method of claim 2, wherein the step of controlling the temperature of an outer wall surface comprises controlling the temperature of the bottom surface of said sizing die.

4. The method of claim 1, wherein the step of passing comprises passing through said coater a fiber having at least one layer of cured coating material thereon.

5. The method of claim 1, further comprising a step of measuring the fiber-coating concentricity of the coated fiber and generating a concentricity signal in response thereto, and wherein the step of generating a temperature gradient comprises generating said non-axisymmetrical temperature gradient in response to said concentricity signal to control the fiber-coating concentricity.

6. The method of claim 5 further comprising the step of measuring the diameter of said coating and generating a diameter signal in response thereto, the step of generating a temperature gradient also being responsive to said diameter signal and controlling the diameter of said coating.

7. The method of claim 1, wherein step of generating a temperature gradient comprises non-axisymmetrically heating said sizing die.

8. The method of claim 1, wherein step of generating a temperature gradient comprises heating said coating material before it is introduced into said sizing die, and non-axisymmetricatly cooling said sizing die.

9. A method for curable coating an optical fiber, comprising the steps of
   a. passing an optical fiber through a coater containing a coating material, said coater having a sizing die, the inner wall of which terminates in an exit orifice through which said fiber passes as it exits said sizing die,
   b. coating said fiber with a layer of said coating material,
   c. measuring the fiber-coating concentricity of the coated fiber, and generating a concentricity signal in response thereto, and
   d. generating a temperature gradient across said exit orifice in response to said concentricity signal to control the fiber-coating concentricity.

10. An apparatus for applying a coating to an optical fiber, comprising
    a. means for introducing a coating material into a coater having a sizing die,
    b. means for continually drawing an optical fiber such that said fiber passes through said coater, and
    c. means for generating a non-axisymmetrical temperature gradient in the coating material within said sizing die to control fiber-coating concentricity.

11. The apparatus of claim 10 wherein said means for generating comprises heating means disposed about said sizing die.

12. The apparatus of claim 11 wherein said sizing die has a plurality of bores therein, said heating means extending into said bores.

13. The apparatus of claim 11 wherein said sizing die includes a bottom surface, and, wherein said heating means comprises a plurality of heaters operatively associated with said bottom surface.

14. The apparatus of claim 11 wherein said sizing die includes a circumferential surface, and, wherein said heating means comprises a plurality of heaters operatively associated with said circumferential surface.

15. The apparatus of claim 10, wherein said means for generating comprises a plurality of thermoelectric chips.

16. The apparatus of claim 10, wherein said means for generating comprises a plurality of heat transfer tubes in thermal contact with said sizing die, and means for altering the temperature of said heat transfer tubes.

17. The apparatus of claim 10, wherein said means for generating comprises a plurality of fins in thermal contact with said sizing die, and means for altering the temperature of said fins.

18. The apparatus of claim 10, wherein said means for heating further comprises resistive heaters in thermal communication with said bottom surface of said sizing die.

19. The apparatus of claim 10 further comprising means for measuring the fiber-coating concentricity and means for generating a concentricity signal in response thereto, said means for generating being responsive to said concentricity signal.

20. The apparatus of claim 10 further comprising means for generating an axisymmetrical temperature gradient in the coating material within said sizing die.

* * * * *